S. G. ZUCKERMAN.
INSCRIPTION PRINTING ATTACHMENT FOR CAMERAS.
APPLICATION FILED JUNE 16, 1915.

1,336,330.

Patented Apr. 6, 1920.
2 SHEETS—SHEET 1.

WITNESSES

INVENTOR
Samuel G. Zuckerman
BY
ATTORNEYS

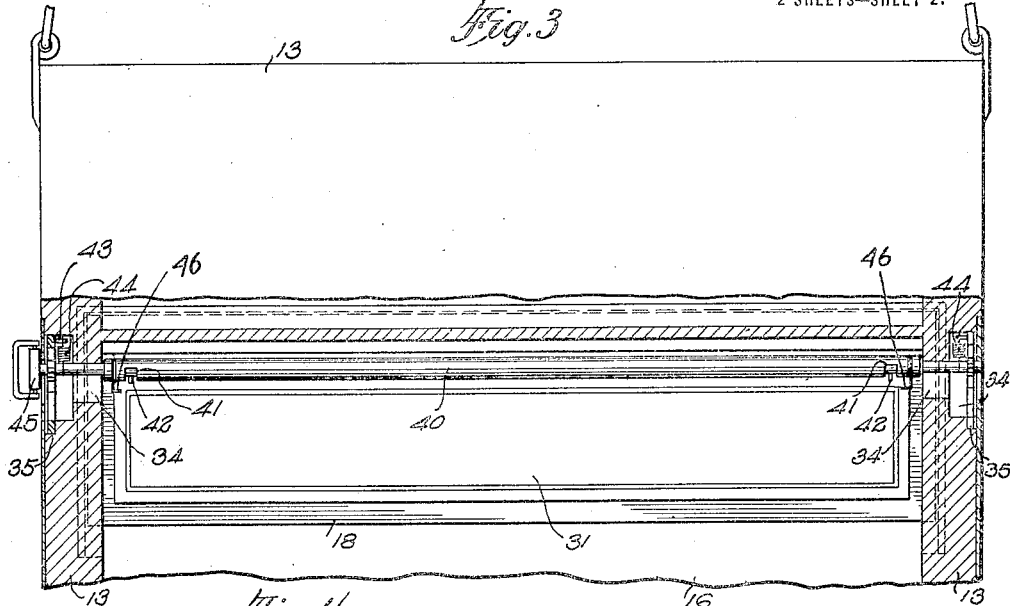
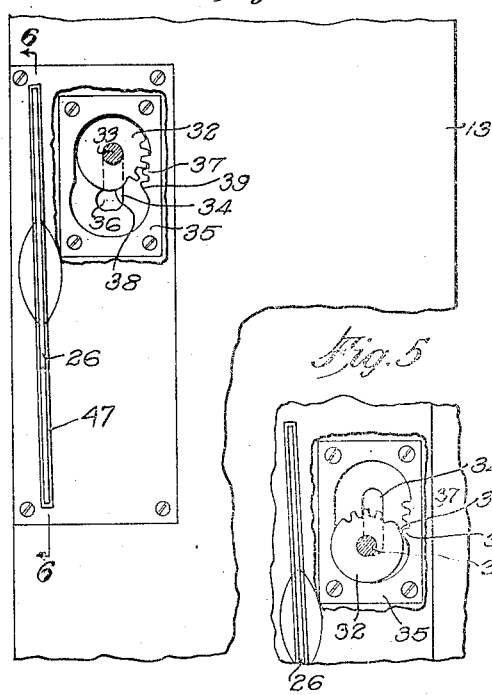
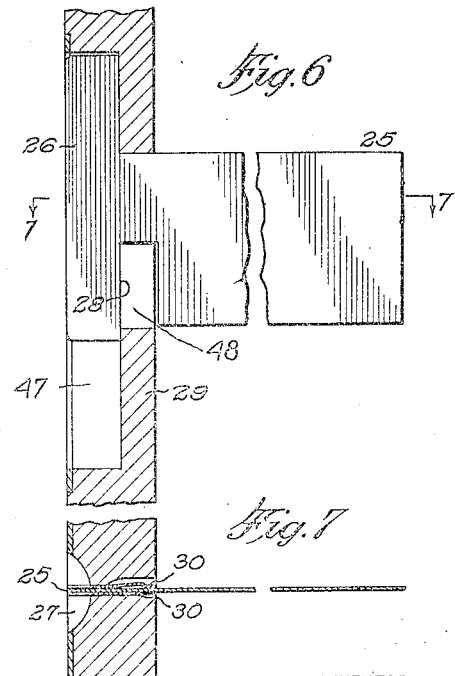

UNITED STATES PATENT OFFICE.

SAMUEL G. ZUCKERMAN, OF NEW YORK, N. Y.

INSCRIPTION-PRINTING ATTACHMENT FOR CAMERAS.

1,336,330.    Specification of Letters Patent.    Patented Apr. 6, 1920.

Application filed June 16, 1915. Serial No. 34,398.

*To all whom it may concern:*

Be it known that I, SAMUEL G. ZUCKERMAN, a citizen of the United States, and a resident of the city of New York, borough of the Bronx, in the county of Bronx and State of New York, have invented a new and Improved Inscription-Printing Attachment for Cameras, of which the following is a full, clear, and exact description.

Among the principal objects which the present invention has in view are the following: To provide means for transferring an inscription to a photographic film to be developed with the remainder of the negative; to impart to the photographic film as a part of the original exposure thereof, an inscription, the reproduction of which on photographic prints will resemble in character that of pencil or ink on white or light paper.

Drawings.

Fig. 3 is a cross section taken as on the line 3—3 in Fig. 1;

Fig. 4 is a detail view showing a fragment of the side of the camera and operating mechanism for the attachment, the mechanism being in position homologous to that shown in Fig. 3;

Fig. 5 is a similar view, showing a smaller fragment of the side of the camera and the operating mechanism for the attachment, the latter being shown in position corresponding with the shifting of the attachment to the inscription printing position, wherein the frame is as shown in Fig. 2 with the frame shutter arranged as in Fig. 1;

Fig. 6 is a detail view showing an inscription printing slide parted and contracted to show the ends thereof; and Fig. 7 is a cross section shown as on the line 7—7 in Fig. 6.

Description.

The objects as set forth above are accomplished by bringing into close contact the sensitized side of the photographic film with the side of a sheet of a translucent substance, on which is written the desired inscription in relatively opaque pencil, ink, etc., (surface of said sheet of translucent substance being adapted to receive inscription) within limits corresponding to a limited portion of the film within which the inscription is desired, and exposing to light said limited portion of film through said sheet of translucent substance. The opaque lines of the inscription on the sheet of translucent substance obstruct the light rays and produce on the negative a relatively light or transparent inscription which when printed on photographic paper produces a dark inscription on a relatively light back ground.

Figure 1:
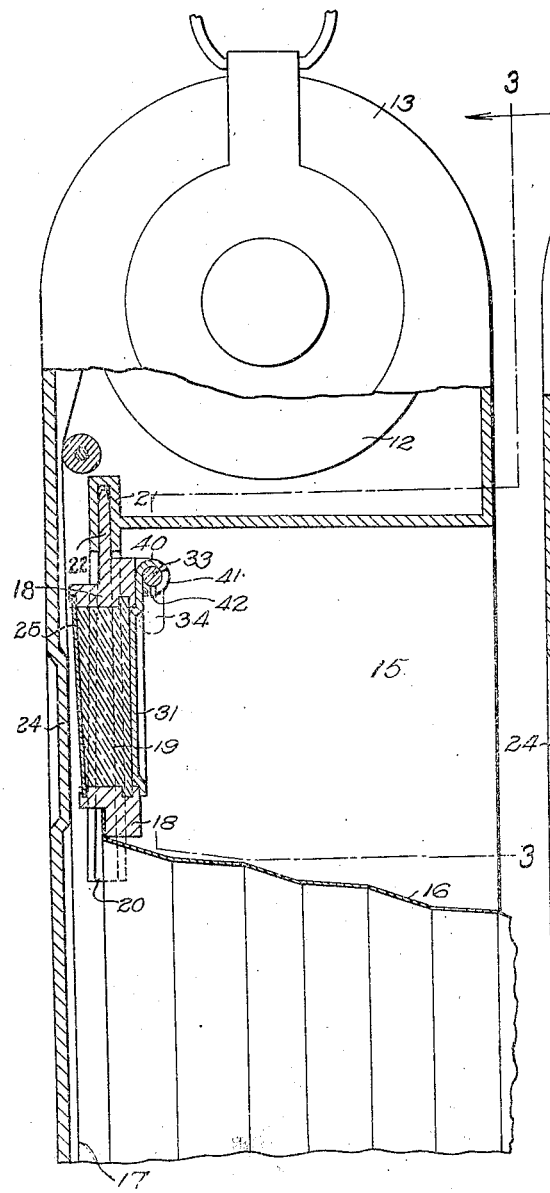
Figure 1 is a vertical section of a camera fragment on an enlarged scale, showing in conjunction therewith a printing attachment of the character mentioned, said attachment being shown in its inactive position.
Figure 2:
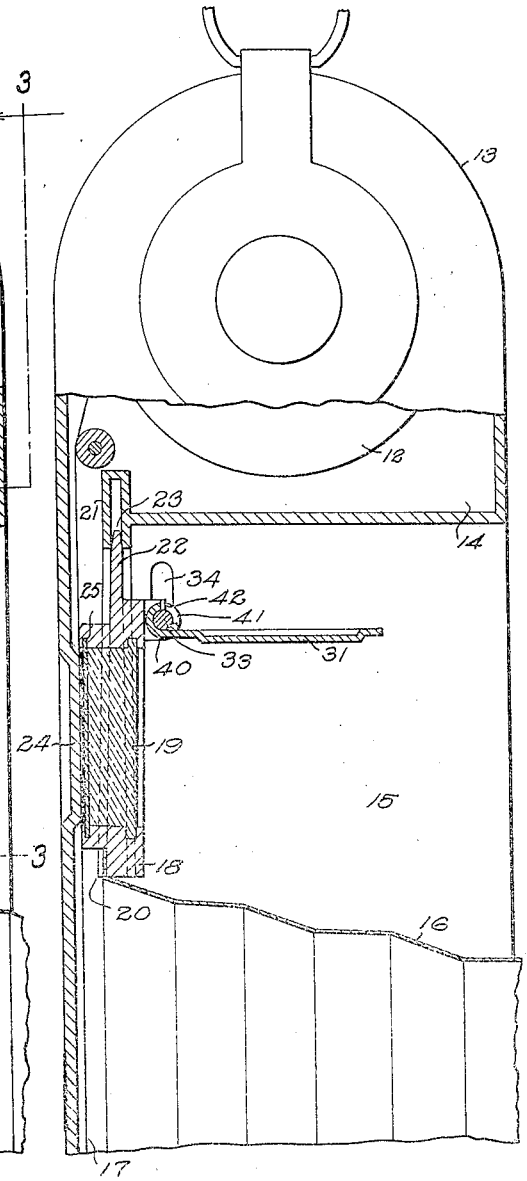
Fig. 2 is a similar view showing the attachment in its operating position.

As shown in the drawings, the invention is applied to form a camera in which a film roll 12 is employed. A case 13 is provided to hold two rolls, such as indicated by the numeral 12 in end compartments 14, between which compartments, a front opening recess 15 is formed to house a bellows 16 and attachments thereto, such as the front board and lens mounted thereon. A section 17 of the film stretches when in service across the recess 15 at the back thereof and across the exposure area of the bellows 16, as in the conventional types of cameras. The inner or rear edge of the upper wall of the bellows 16 is rigidly attached to the lower rail of a movable printing frame 18, which is elevated and depressed as shown in Figs. 1 and 2 respectively, by a suitable mechanism hereinafter disclosed.

The frame 18 has disposed lengthwise thereof, a translucent plate 19, constructed preferably from celluloid. The frame is guided in grooved members 20 formed in the side of the case 13. The members 20 are connected transversely by an open edged channel bar 21. The channel bar 21 is provided to hold the apron board 22, with which the frame 18 is provided and which extends the full length of the said frame. The board 22 is provided with a reduced edge 23, which forms in conjunction with the lower edges of the bar 21, a pivot on which the frame 18 is swung when moved to and from the bed 24 with which the case 13 is provided at the back thereof. The swinging movement thus provided for the frame 18, moves the plate 19 and inscription plate 25 to rest upon the film section 17, the said plate forming contact with the said film section. In this manner, whatever inscription is placed on the plate 25 is held close to the film section 17 to normally print thereon when light is permitted to pass through the plate 19 and plate 25 to the said film section at the rear of the said plates. The inscription plate 25 is made of any suitable translucent material such as paper, celluloid, etc., adapted to receive an inscription in pencil or pen.

Normally light is prevented from passing through the plate 19 by a shutter door 31. During the preliminary movement of the frame 18, the said door remains in the closed position shown in Fig. 1 of the drawings. This continues until the frame 18 has been swung into position to force the plate 25 against that portion of the film section 17 resting on the bed 24. It is after this arrangement of the parts has been effected that the door 31 is lifted to the position shown in Fig. 2 of the drawings. When the door is thus lifted, it is obvious that light passing through the plate 19 and plate 25, affects the film section 17 in the manner common to photographic operation.

The frame 18 is elevated and depressed by mutilated gear wheels 32, one of which is located at each of the opposite sides of the case 13 and at opposite ends of a shaft 33, to which shaft, the said wheels are rigidly attached. The shaft 33 is guided in its movement by vertical slots 34 formed in the side of the case 13. The slots 34 have each a lateral extension 36 into which the shaft 33 is moved when shifting the frame 18 to place the plate 25 in operative relation to the film section 17. To raise and lower the said frame, the teeth of the mutilated gear wheels 32 engage the teeth of the short racks 37. The last of the said teeth pass out of engagement when the shaft 33 rests at the bottom of the slots 34. A continued rotation of the shaft 33 and the wheels 32 now results in the shoulder 38 pressing on the abutment 39, with the resultant shifting of the shaft 33 into the extension 36. This position is best seen in Fig. 5 of the drawings.

With the frame 18 thus disposed, it is necessary to lift the shutter door 31. The door 31 has a tubular hinge 40 through which the shaft 33 extends. Adjacent the ends of the hinge 40, recesses 41 are formed and within which operate the pins 42, set out from the shaft 33. To permit the seating of the frame 18 prior to lifting the door 31, the pins 42 do not engage the hinge 40 until the shaft 33 and wheels 32 have been rotated to dispose said shaft in the extension 36. When the pins 42 engage the ends of the recesses 41, the door 31 is lifted to the position shown in Fig. 2 of the drawings.

The shaft 33 is rotated manually, the operator engaging for this purpose the handle 45, shown best in Fig. 3 of the drawings. Surrounding the shaft 33 and bearing upon the shutter door 31, are springs 46, the operation of which is to maintain the shutter door 31 normally closed, when permitted to do so by the removal of the pins 42, when the said shaft 33 is rotated for return of the shutter door to its initial position. This construction is best shown in Fig. 6 of the drawings. In Fig. 7, the light stops 30 are shown to illustrate the manner in which light is excluded from the space holding the film section 17, while removing or reinstating the plate 25. The light stops 30 are of conventional construction.

The inscription plate 25 is inserted into the frame 18 while in position as shown in Figs. 1 and 4 through the slot 48 in the side of the camera situated directly opposite the grooves in the frame 18. To provide for lowering the plate 25 together with frame 18, the plate 25 has a slot 28 formed therein to straddle the reduced section 29 of the case 13.

To facilitate the inserting and removing of plate 25, recess 27 is provided to enable the operator to have a hold on said plate 25. It will be understood that the head 26 is extended beyond the side edges of the plate 25, as best shown in Figs. 4 and 6 of the drawings. To accommodate the head 26, the camera frame is provided with a vertical slot 47. It will also be noted that the slot 28 formed in the plate 25, is slightly larger than the thickness of the reduced section 29 of the camera frame. This permits the inner edge of the head 26 to be moved firmly against the outer surface of the said reduced portion to close the slot 48 formed in the reduced section 29 for the insertion of plates 25. In this connection, it will be understood that a number of such plates, as indicated by the numeral 25, are employed in conjunction with the herein described attachment. Suitable means for carrying these inscription plates may also be provided in the camera frame.

When the frame 18 is lifted to the position shown in Fig. 1 of the drawings, the grooves formed in the said frame to receive the plates 25, will be found to register with the opening of the slot 48, provided in the side of the camera frame. By this means, the plates 25 are accurately adjusted to their working position. It will also be noticed that the upper end of the head 26 will effectively cover the slot 48 when in the course of operation, the frame 18 is shifted to the position shown in Fig. 2 of the drawings. In this connection, it will be noted that the head 26 is constructed from material sufficiently pliable to conform with the straight extension of the slot 47, when the frame 18 swings on the apron 22 in the manner above described.

Operation.

Having a camera provided with an attachment of the character disclosed, the operation is as follows:

The camera is adjusted for the exposure in a manner common to cameras of conventional construction and arrangement. Upon the area provided therefor, the inscription is written, using any desired medium, such as pencil or pen. The inscription having been thus imparted to the plate, the plate is reinserted in the frame 18 in the grooves formed in the said frame therefor with the inscription facing the film.

The photographic exposure having been made, the operator grasps the handle 45 and rotates the shaft 33 and the wheels 32 mounted thereon. The teeth of the said wheels engage the teeth of the racks 37, with the result that the shaft 33 and frame 18 connected therewith, are depressed, the frame being guided in its operative position, shown in Fig. 2 of the drawings, by the grooves in the members 20. It will be observed that when the shaft 33 rests at the bottom of the slots 34 opposite the extension 36, the contracted edge 23 of the board 22, is at the lower opening of the channel bar 21. When now the wheels 32 are further rotated, the shoulders 38 press against the abutments 39 and move the shaft 33 into the extensions 36, the frame 18 is swung toward the bed 24, until the plate 25 is forced against that portion of the film section 17 which rests thereon. In this manner, the lines of the inscription on the plate 24 are brought into close contact with the sensitized surface of the plate 25.

By further rotating the shaft 33 and wheels 32, the door 31 is lifted to the position shown in Fig. 2 of the drawings, which permits the light from the recess 15 of the case 13 to pass through the plate 19 and plate 25 to the sensitized surface of the film section 17. When the exposure has been sufficiently prolonged, the handle 45 is operated in the reverse direction from that above described and with the effect that the door 31 is closed, the frame 18 is retracted from the bed 24, and the frame 18 is then raised to its normal position, which operations are performed successively and in the way named.

It will be observed that when the original exposure by the operation of the camera, is made, the frame 18 is in the position shown in Fig. 1 of the drawings and the exposed area of the film section 17 is adjacent the lower edge of the bed 24 and that when the carriage frame 18 is lowered to the position for printing, or inscription, the plate 25 and plate 19 are carried slightly below the upper edge of the previously exposed area. In this manner, the demarcation or contrast of color between the exposed areas is avoided.

*Claims.*

1. In combination with a camera having a folding bellows and a containing recess for the same; a frame extending transverse said recess and supporting one of the inner edges of said bellows, said frame embodying a light passage formed lengthwise thereof; means for temporarily obstructing the passage of light through said frame; a removable translucent inscription plate mounted in said frame and across said passage for juxtaposition to a sensitized member carried by said camera; and means manually operative for moving said frame to and from said sensitized member.

2. In combination with a camera having a focusing bellows, a movable printing frame rigidly attached to one edge of said bellows for supporting the same, said frame being adapted for juxtaposition with the exposure area of the sensitized sheet in the camera and rear opening of said bellows, a translucent inscription plate mounted in said printing frame, and light-tight means for temporarily closing said printing frame for preventing light reaching a sensitized photographic member in said camera.

3. In combination with a camera having a focusing bellows, a movable printing frame rigidly attached to one edge of said bellows for supporting the same, said frame being movable toward and away from the film and into overlapping relation or juxtaposition and away from the exposure area of the film in the camera and rear opening of said bellows, a translucent inscription plate mounted in said frame at the rear thereof, a light-tight shutter pivotally mounted on said frame for normally preventing light from passing through said inscription plate, and manually operated means for shifting said frame and for operating said shutter when the frame is disposed as in service or printing position.

4. In combination with a camera having a focusing bellows; a movable printing frame rigidly attached to one edge of said bellows for supporting the same; a translucent inscription plate mounted in said frame at the rear thereof; means for shifting said frame to printing position, said means embodying a rotary shaft and gear wheels mounted thereon; a rack plate having teeth for engaging the teeth of said gear wheels; an abutment for shifting said gear wheels and the shaft on which they are mounted in a direction transverse to the direction of the initial movement of said frame; a light-tight shutter mounted on said shaft and adapted to be swung thereby to expose said inscription plate when said frame is shifted to printing position.

In witness whereof I have signed my name to this specification in the presence of two subscribing witnesses.

SAMUEL G. ZUCKERMAN.

Witnesses:
E. F. MURDOCK,
PHILIP D. ROLLHAUS.